June 26, 1934.    L. ROTH    1,964,301
NONREFILLABLE CONTAINER
Filed June 19, 1933
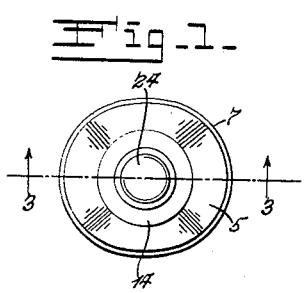
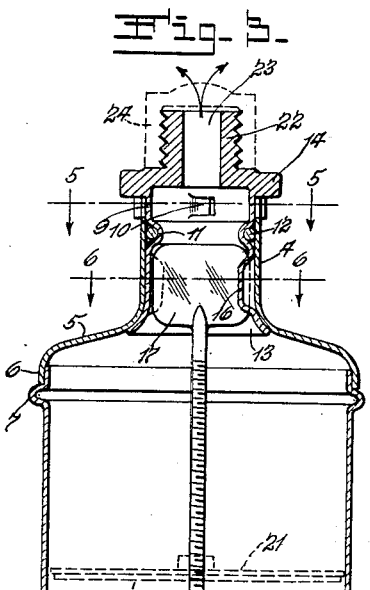
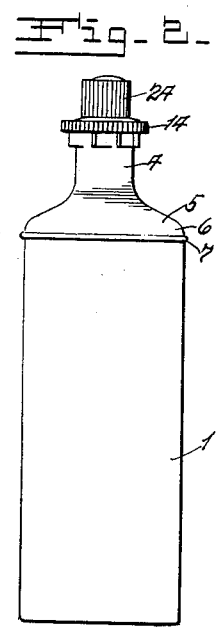
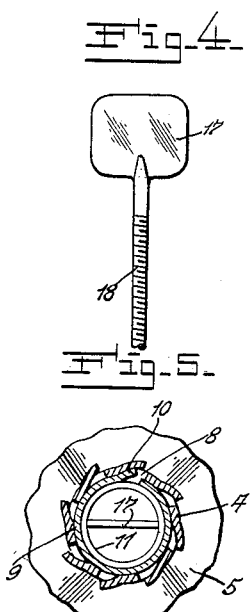
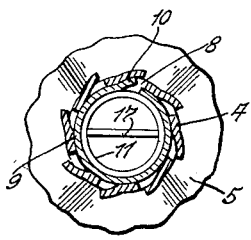
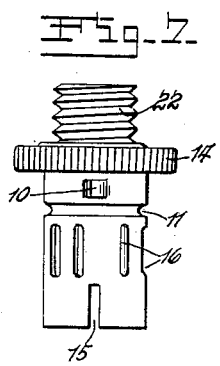
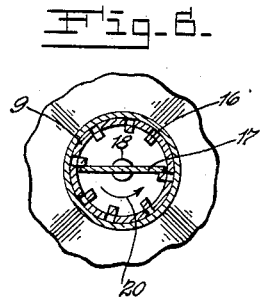
Inventor
Ludwig Roth
by Rippey & Kingsland
His Attorneys.

UNITED STATES PATENT OFFICE 1,964,301

NONREFILLABLE CONTAINER

Ludwig Roth, St. Louis, Mo., assignor of one-fourth to Albert W. Hohlt, St. Louis, Mo.

Application June 19, 1933, Serial No. 676,521

4 Claims. (Cl. 221—79)

This invention relates to non-refillable containers, and has special reference to improvements in manually operative devices for controlling the discharge from the container of the contents thereof.

Objects of the invention are to provide an improved non-refillable container having a discharge outlet nozzle at one end, in combination with a rotary operating member at the discharge end of the container connected with a piston or ejector in the container whereby the contents will be ejected from the container through said nozzle when said rotary device is turned in one direction.

Another object of the invention is to provide a construction for preventing reverse turning of the rotary device that operates the ejector, thus holding the ejector at all times in position to support the contents of the container at the discharge end thereof.

Another object of the invention is to provide an improved non-refillable container for shaving creams, cold creams, vanishing creams, lotions, ointments, and all semi-fluid or plastic substances that may be manufactured and used economically so that the non-refillable container may be discarded and thrown away without substantial expense or cost after the contents thereof have been ejected.

Other objects of the invention will be readily apparent from the following description, reference being made to the annexed drawing, in which—

Fig. 1 is a top plan view of my improved non-refillable container.

Fig. 2 is a side elevation.

Fig. 3 is an enlarged vertical sectional view on the line 3—3 of Fig. 1.

Fig. 4 is a side elevation of the end portion of the piston rod constituting the ejector.

Fig. 5 is a cross sectional view on the line 5—5 of Fig. 3.

Fig. 6 is a cross sectional view on the line 6—6 of Fig. 3.

Fig. 7 is an enlarged side elevation of the actuator for the ejector before being connected with the container.

In the embodiment of the invention shown, my improved container comprises an outer enclosing wall 1 in connection with a bottom wall 2. These walls may be made of any appropriate material, and may be made separately and attached together, or formed in one unitary piece, as desired. The bottom wall 1 has a central bearing 3.

The upper end of the container is preferably formed of metal or metallic alloy, including a cylindrical neck 4 extending upwardly from integral connection with the flaring portion 5 having a terminal portion 6 telescoped on the upper end of the wall 1 and seating against a circumferential rib or flange 7 formed in integral connection with said wall 1.

Preferably the wall 1 is oval in cross section and end elevation and the portion 6 is of similar shape and forms an hermetic and leak-proof joint in its connection with the wall 1.

The cylindrical neck 4 is formed with an annular series of shoulders 8 on the inside. These shoulders 8 may be provided by slitting the tubular neck 4 and bending outwardly the part of the neck 4 at one side of each slit, as should be readily understood by reference to Fig. 5 of the drawing. The connection of this upper end of the container with the container wall 1 is preferably permanent, so that the parts cannot be separated or detached, thus assuring that the container cannot be refilled after the contents of the container have once been ejected.

A cylindrical member 9 is mounted in the neck 4 for turning movements in one direction only. This cylindrical member is formed with an outwardly extended resilient tongue 10 arranged to engage against the shoulders 8 and to yield to permit the cylindrical member to be turned in one direction but to cooperate with said shoulders 8 to prevent said cylindrical member 9 from being turned in the opposite direction. The cylindrical member 9 is formed with a circumferential groove 11 designed and intended to contain an elastic packing ring 12 to form an hermetic and leak-proof joint between the rotary member 9 and the neck 4.

The inner end of the cylindrical member 9 has an outwardly flared portion 13 engaging against the rounded shoulder at the union of the parts 4 and 5, thus preventing outward withdrawal of the rotary member 9 from within the neck 4. A circumferential flange 14 in connection with the outer end of the rotary member 9 engages against and extends radially beyond the end of the neck 4 and thus prevents the rotary member 9 from moving inwardly beyond its intended position. In order to facilitate formation of the flaring portion 13, the inner end of the rotary member 9 may be formed with one or more slits 15 (Fig. 7).

A number of inwardly extended ribs or flanges 16 are formed in the rotary member 9 inwardly beyond the packing groove 11 and these ribs or flanges are designed and intended to engage against the marginal portions of a plate 17 mounted approximately diametrically within the inner portion of the rotary member 9 (Figs. 3 and 6). The plate 17 is attached to the upper end of a threaded rod 18, the lower end of which is rotatively mounted in the bearing 3. Thus, the rod 18 extends axially through the container and is rotative therein. Outward longitudinal movement of the rod 18 is prevented by engagement of the plate 17 against the beaded portion of the rotary member 9 forming the groove 11 (Fig. 3).

A piston disc 19 of oval shape in plan view, in conformity with the oval form of the wall 1, is screwed on the rod 18 and will be screwed along said rod from the bottom toward the top of said container when the rotary device and the rod 18 are turned in a counter-clockwise direction, for instance, as indicated by the arrow 20 (Fig. 6), which is the direction in which the rotary device 9 may be turned. Thus, the rotary device 9 cannot be turned in the reverse direction which would move the piston 19 along the rod 18 toward the bottom of the container. A flexible sealing member 21 for the piston disc 19 is mounted on the upper side of said disc and has its marginal portion in close sealing engagement with the inner surface of the wall 1, so that when the piston is moved along the rod 18 from the bottom toward the top of the container, it is impossible for the contents of the container to pass between the sealing device 21 and the wall of the container; but, on the contrary, the contents of the container will be moved upwardly and ejected from the container when these devices are rotated.

The flange 14 constitutes an ornamental device and also functions as a manually engageable handle which may be conveniently engaged and operated to move the piston 19—21 along the rod 18 in order to eject the contents of the container.

A threaded nozzle 22 is formed in integral connection with the flange 14 and has a discharge opening 23 through which the contents of the container will be discharged when the ejector piston 19—21 is operated by turning the rotary actuator therefor. A closure cap 24 may be screwed on the nozzle 22 for removal and replacement, to be removed when it is desired to eject any of the contents from the container and replaced after the desired amount of the contents have been ejected.

The construction, arrangement and mode of operation of the devices comprising my invention may be varied within the scope of equivalent limits without departure from the nature and principle of the invention. I do not restrict myself in unessential particulars or otherwise than as set forth in the appended claims:

I claim:

1. A container having an upper end wall provided with an opening, a cylindrical neck rigid with said end wall and surrounding said opening and having an annular series of shoulders on the inner side thereof, a cylindrical member mounted for rotation in said neck, a resilient tongue integral with said cylindrical member engaging said shoulders and preventing said cylindrical member from turning in one direction and permitting turning thereof in the opposite direction, a circumferential flange on the end of said cylindrical member engaging against and extending radially beyond the upper end of said neck and being manually engageable to rotate said cylindrical member, means preventing outward longitudinal movement of said cylindrical member, a rod extending downwardly in said container, a plate rigid with the upper end of said rod and extending into said cylindrical member, means for rotating said plate and thereby said rod by said cylindrical member, and a piston screwed on said rod and forming a partition to support and eject the contents of the container when said piston is screwed upwardly on said rod.

2. A container having an upper end wall provided with an opening, a cylindrical neck rigid with said end wall and surrounding said opening, an annular series of shoulders on said neck, a cylindrical member mounted for rotation in said neck, a resilient tongue integral with said member engaging said shoulders and preventing said cylindrical member from turning in one direction and permitting turning thereof in the opposite direction, a rod extending downwardly in said container, a plate rigid with the upper end of said rod and extending into said cylindrical member, means for rotating said plate and thereby said rod by said cylindrical member, and a piston screwed on said rod and forming a partition to support and eject the contents of the container when said piston is screwed upwardly along said rod.

3. A container having an upper end wall provided with an opening, a cylindrical neck rigid with said end wall and surrounding said opening, a cylindrical member mounted for rotation in said neck, interlocking means on said neck and said member preventing said member from turning in one direction and permitting turning of said member in the opposite direction, a plate extending into said cylindrical member, a threaded rod rigid with said plate and extending downwardly in said container, and a piston screwed on said rod and forming a partition to support and eject the contents of the container when said piston is screwed upwardly along said rod.

4. A container having an upper end wall provided with an opening, a cylindrical neck rigid with said end wall and surrounding said opening, a cylindrical member mounted for rotation in said neck and having its inner end portion flared outwardly and engaging against the inner surface of said end wall around said opening through said neck, a flange integral with the outer end of said member engaging against the outer end of said neck and extending radially beyond said neck for manual engagement to rotate said member, means preventing turning of said member in one direction and permitting turning thereof in the opposite direction, a threaded rod extending axially in said container, a plate rigid with the upper end of said rod in said cylindrical member, means for rotating said plate and thereby said rod by said member, and a piston screwed on said rod in said container.

LUDWIG ROTH.